United States Patent

[11] 3,615,858

[72] Inventor Luis Soto-Krebs
 Santiago, Chile
[21] Appl. No. 445,904
[22] Filed Apr. 6, 1965
[45] Patented Oct. 26, 1971
[73] Assignee ESB Incorporated
 Philadelphia, Pa.

[54] BATTERY COMPRISING POSITIVE ELECTRODE COMPOSED OF PRINCIPAL AND SECONDARY ACTIVE MATERIAL WHEREIN SOLE ELECTRONIC PATH IS THROUGH THE SECONDARY ACTIVE MATERIAL
 5 Claims, 9 Drawing Figs.
[52] U.S. Cl.................................................. 136/107,
 136/83, 136/102, 136/111
[51] Int. Cl....................................................H01m 21/00,
 H01m 17/00
[50] Field of Search.......................................... 136/6, 30,
 83, 102, 120, 100, 20, 23, 28, 107, 115, 111

[56] References Cited
 UNITED STATES PATENTS
 2,542,710 2/1951 Ruben........................... 136/107
 2,795,638 6/1957 Fischbach..................... 136/120

Primary Examiner—Winston A. Douglas
Assistant Examiner—A. Skapars
Attorneys—Alfred J. Snyder, Jr. and Robert H. Robinson ABSTRACT: A battery electrode composed of a principal active material and a secondary active material and a method of discharging the same so as to achieve the discharge potential characteristic of the secondary active material wherein the sole electronic path for discharge of the principal active material is through the secondary active material. The discharge product of the secondary active material must be readily oxidized by the principal active material.

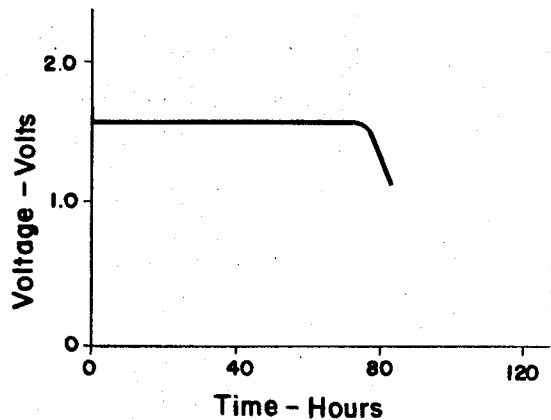
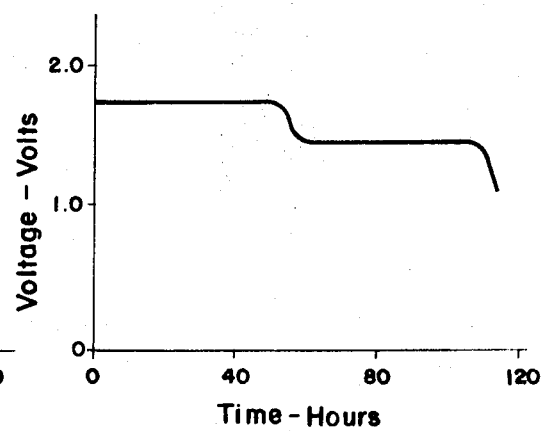
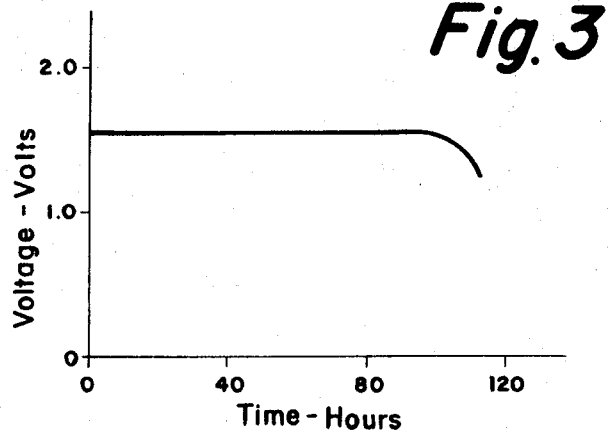
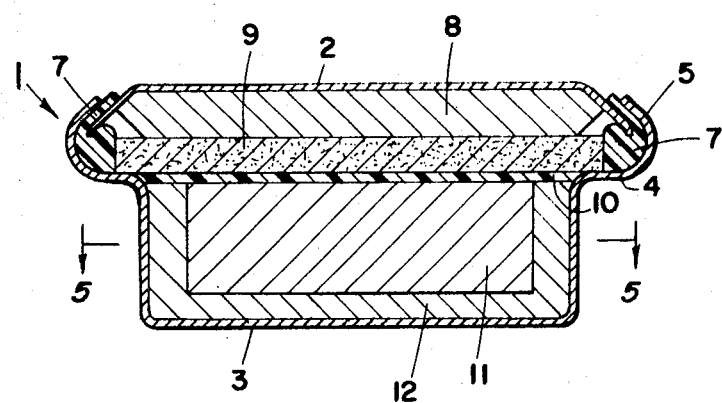

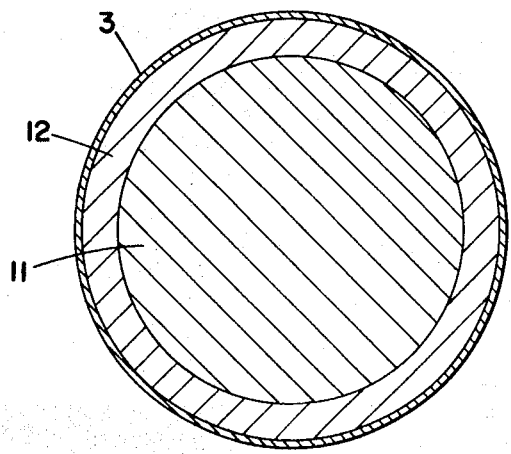
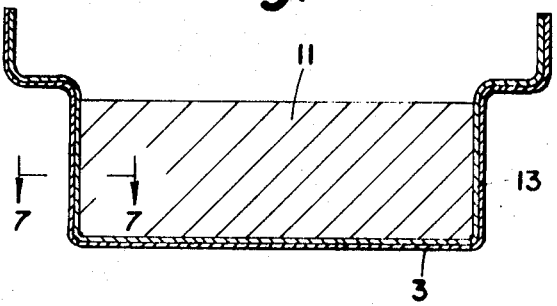
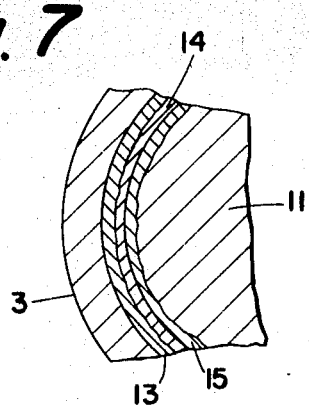
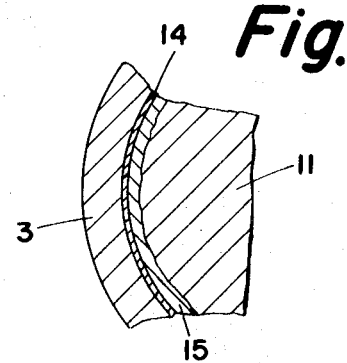
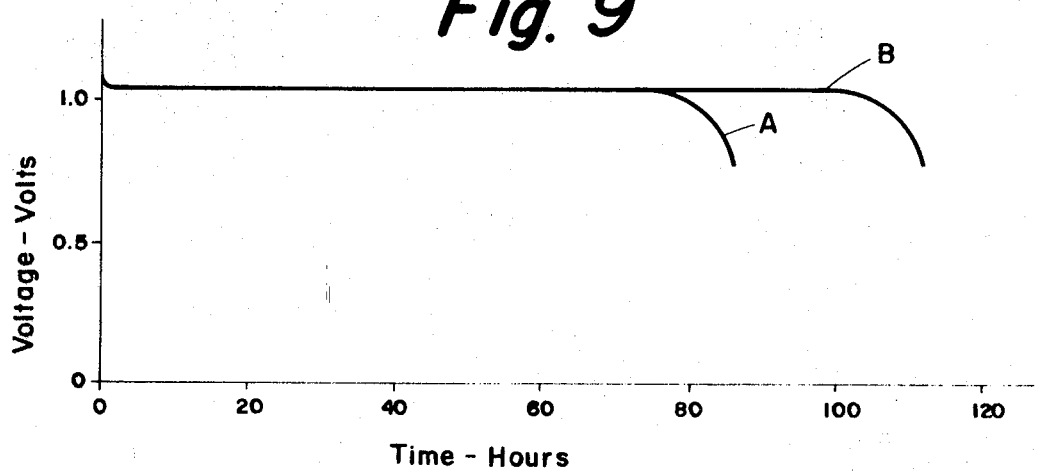

BATTERY COMPRISING POSITIVE ELECTRODE COMPOSED OF PRINCIPAL AND SECONDARY ACTIVE MATERIAL WHEREIN SOLE ELECTRONIC PATH IS THROUGH THE SECONDARY ACTIVE MATERIAL

Certain battery applications require a substantially constant voltage during discharge. Other applications demand a particular discharge voltage. Most applications dictate that the battery supply a maximum capacity while simultaneously restricting its size and weight. The problem of furnishing a battery for a given application is complicated by the fact that while some electrode active materials have inherently good capacities, they discharge at two or more potentials. Moreover, those materials which are most active and hence most desirable for battery use characteristically discharge at several voltage levels, thus making their use impracticable. Still other active materials which have good capacities and substantially constant discharge voltages, discharge at potentials which may not be suitable for a particular application.

It is, accordingly, a general object of the present invention to provide a new and improved electrode construction characterized by an increase in capacity per unit weight and volume.

It is another object of the present invention to provide electrode means for utilizing an active material at the lower potential of a second active material.

It is still another object of the present invention to provide electrode means for achieving a single potential discharge from a multivalent oxide, such as divalent silver oxide, that discharges at two or more potentials. It is a further object of the present invention to provide an electrode having two different active materials which will utilize the capacity of both materials at the potential of the lower potential material.

It is still a further object of the present invention to provide a new and improved button-type cell construction.

While not limited thereto, the principle of the present invention can be illustrated by means of a divalent silver oxide electrode which discharges at two different potentials. During the initial discharge of such an electrode, the divalent silver oxide is reduced to monovalent silver oxide. Theoretically, this reaction proceeds until all of the divalent silver oxide has been reacted. Next the monovalent silver oxide is further reduced to metallic silver. The first reaction, while divalent silver oxide is present, provides an open circuit potential, in an alkaline electrolyte of approximately 1.8 volts vs. zinc. The second reaction, while monovalent silver oxide is present, provides an open circuit potential in an alkaline electrolyte of approximately 1.6 volts vs. zinc.

In practice, due to such effects as polarization and the masking of the divalent oxide by the formation of monovalent oxide, before a divalent silver oxide cell is halfway through its useful life, its output voltage will drop 0.2 volts. Many types of battery-operated electronic equipment cannot tolerate a voltage change of this magnitude. A divalent silver oxide electrode in accordance with the present invention, however, will deliver all of its capacity at the monovalent potential, thus providing a substantially constant output voltage.

To achieve a lower potential discharge from an active material in accordance with the present invention, three conditions must be met. First, the discharge product of the lower potential active material must be readily oxidizable in the battery electrolyte by the higher potential active material. Second, the higher potential active material must be in electronic contact with the lower potential material. Third, the discharge circuit must have electronic connection only with the lower potential active material.

Divalent silver oxide and monovalent silver oxide are examples of active materials which satisfy the first condition stated above. The discharge product of the lower potential active material, monovalent silver oxide, is metallic silver. Metallic silver is readily oxidizable by the higher potential active material, divalent silver oxide, to monovalent silver oxide. The second and third conditions are achieved in accordance with the present invention by a novel electrode structure utilizing as the principal active material a body of divalent silver oxide having thereon as the secondary active material a layer of monovalent silver oxide. The electrode contact means, that is, the electrical path for the discharge circuit is in contact only with the monovalent silver oxide layer.

While the present invention has been described hereinbefore in connection with divalent silver oxide and monovalent silver oxide, the principles are applicable to other electrode active materials. Generally stated, the present invention provides a method of operating a battery at a lower potential than that normally developed by the principal active material. This method comprises withdrawing current from the principal active material through a current path consisting solely of an interposed layer of secondary active material of a lower potential having a discharge product which is readily oxidized by the principal active material. The lower potential achieved from the electrode is that developed by the interposed layer of the secondary active material. Stated another way, the method of the present invention comprises maintaining electronic contact during discharge between the principal active material and the discharge circuit only through the secondary active material.

By way of example of the applicability of the present invention to other active material, manganese dioxide can be discharged at the lower potential of copper oxide. Similarly, divalent silver oxide can be discharged at the potential of copper oxide as well as at the potential of lead dioxide. Potassium permanganate can be discharged at a lower potential such as that of monovalent silver oxide or copper oxide. These examples are illustrative of only a few electrode combinations which are possible by means of the present invention.

A better understanding of the present invention may be had from the following description when read with reference to the accompanying drawings of which:

FIG. 1 is a curve showing the theoretical discharge characteristics of a silver-zinc primary cell using as the active material of the positive electrode monovalent silver oxide;

FIG. 2 is a curve showing the theoretical discharge characteristics of a silver-zinc primary cell identical to the primary cell of FIG. 1 but using as the positive active material an equal volume of divalent silver oxide;

FIG. 3 is a curve showing the theoretical discharge characteristics of a silver-zinc primary cell identical to the cells of FIGS. 1 and 2, but using a positive electrode in accordance with the present invention;

FIG. 4 is a cross-sectional view of a primary silver-zinc cell having composite positive silver electrode in accordance with the present invention;

FIG. 5 is a top elevation taken along the line 5—5 of FIG. 4;

FIG. 6 is a cross-sectional view of an electrode in accordance with the present invention wherein the isolating layer of secondary active material is formed by the in situ reduction of the principal active material by the metal of the inner surface of the electrode cup;

FIG. 7 is a partial sectional elevation taken along the line 7—7 of FIG. 6 and enlarged;

FIG. 8 is another partial sectional elevation taken along the line 7—7 of FIG. 6 illustrating a modification of FIG. 7; and FIG. 9 is a curve showing the discharge characteristics of an actual primary silver-zinc cell in accordance with the present invention compared to the discharge characteristics of another cell of the same type but incorporating a positive electrode comprising an equal volume of monovalent silver oxide.

As indicated hereinbefore, both the broad and specific features of the present invention can be illustrated in connection with a positive silver electrode. The capacity in milliampere hours per gram and the specific gravity of both divalent and monovalent silver oxide are given in the following table:

TABLE I

|  | MA.H./gm. | Sp. Gr. |
|---|---|---|
| Monovalent Silver Oxide ($Ag_2O$) | 232 | 7.14 |

| | | |
|---|---|---|
| Divalent Silver Oxide (AgO) | 433 | 7.44 |

As shown, divalent silver oxide has 1.87 times more capacity per gram than the monovalent oxide and has 1.95 times more capacity per unit volume than the monovalent oxide. The significance of this becomes apparent with reference to FIGS. 1 and 2. FIG. 1 shows a theoretical discharge curve of a conventional silver-zinc primary cell using monovalent silver oxide as the positive active material. FIG. 2 shows the theoretical discharge curve of a similar cell utilizing an equal volume of divalent silver oxide as the positive active material. Both of the discharge characteristics shown represent continuous discharges through a 300-ohm load at 73° F. Obviously, the cell of the FIG. 2, the cell utilizing divalent silver oxide as the positive active material, has substantially more usable capacity than the cell in FIG. 1. However, while the divalent silver oxide cell has significantly more capacity than the monovalent silver oxide cell, its discharge is characterized by two distinct voltage plateaus. One, at approximately 1.72 volts and the other at approximately 1.5 volts. Many battery applications, particularly transistorized devices such as hearing aids, cannot tolerate a voltage drop such as is exhibited by the cell of FIG. 2.

The electrode structure of the present invention is designed to provide means for utilizing the capacity of an inherently high-capacity material such as divalent silver oxide at the potential of a second material having a lower potential such as monovalent silver oxide. Referring to FIG. 3, there is shown the theoretical discharge curve of a silver-zinc cell identical to those shown in FIGS. 1 and 2, except that it utilizes an electrode of the present invention. The curve of FIG. 3 is plotted for discharge conditions identical with FIGS. 1 and 2. As shown by this curve, the cell exhibits a single potential discharge at the monovalent oxide potential level while utilizing the capacity of divalent silver oxide at that lower potential.

Referring now to FIG. 4, there is shown a sectional elevation of a silver-zinc primary cell, designated by the numeral 1, having a positive electrode in accordance with the present invention. The cell 1 is conventional in all respects with the exception of the construction of the positive electrode. The cell 1 has a two-part container comprising an upper section or cap 2 which houses the negative electrode, and a lower section or cup 3 which houses the positive electrode. As shown, the bottom cup 3 is formed with an annular shoulder 4 having a flange 5 which is crimped inward during assembly to seal the cell. The bottom cup 3 may be made of nickel-plated steel, and the cap 2 may be made of tin-plated steel. The cap 2 is insulated from the cup 3 and the flange 5 by means of a grommet 7 which is compressed between the cap 2 and the flange 5 during the crimping operation of cell assembly to provide a compression seal between these parts. The grommet 7 may be made of a suitable resilient electrolyte-resistant material such as neoprene.

The negative electrode of the cell 1 comprises a lightly compacted pellet 8 of finely divided amalgamated zinc. The zinc electrode 8 is separated from the positive electrode by means of an electrolyte-absorbent layer 9 and a membrane barrier 10. The electrolyte-absorbent layer 9 may be made of electrolyte-resistant, highly absorbent substance such as matted cotton fibers. Such a material is available commercially under the trademark Webril. The barrier layer 10 may be a suitable semipermeable material such as cellophane, or comprise a suitable organic carrier such as polyethylene or polyvinyl chloride having a polyelectrolyte homogeneously dispersed therethrough. Such a material is described and claimed in U.S. Pat. No. 2,965,697, issued Dec. 20, 1960, to J. C. Duddy.

The positive electrode of the cell 1 comprises, in accordance with the present invention, a first pellet 11 of the divalent silver oxide which is surrounded on the bottom and side surfaces by a layer of monovalent silver oxide 12. The pellet 11 of divalent silver oxide is the principal active material and comprises the majority of the active material in the electrode available for discharge. The layer of monovalent silver oxide 12 is the secondary active material. As shown in FIGS. 4 and 5, the layer 12 of monovalent silver oxide isolates the pellet of divalent silver oxide from all electronic contact with the bottom cup 3 which is the positive terminal of the cell and the electrode contact.

This electrode may be formed in a number of ways. For example, the pellet 11 may be formed by pelletizing finely divided divalent silver oxide powder in a suitable die. This pellet may then be centered in a bigger pellet die, and finely divided monovalent silver oxide powder compressed around it to form the composite pellet of the type shown in FIGS. 4 and 5. It is possible also to form the electrode by pelletizing a suitable quantity of divalent silver oxide powder and then chemically reducing its surface to the monovalent oxide. In addition, where desired, the surface layer of the divalent silver oxide pellet can be reduced to metallic silver and that layer subsequently reoxidized to monovalent oxide. Electrochemical reduction can also be utilized to reduce the surface layer of a divalent silver oxide pellet to the monovalent oxide. It should be noted that the thinner the layer of monovalent silver oxide the more divalent oxide can thus be included in the electrode increasing its capacity. However, under no circumstances should there be a discontinuity in the monovalent oxide layer which would provide direct electronic contact between the divalent oxide body and the discharge circuit. Such a discontinuity would cause the electrode to discharge in the conventional manner with two voltage plateaus.

Referring now to FIG. 6, there is shown another embodiment of the electrode of the present invention in which the monovalent silver oxide layer is formed in situ by a chemical reaction between the divalent oxide pellet and a metallic coating on the electrode cup. Specifically, the inner surface of the cup 3 is plated with a layer 13 of a metal which will be oxidized by divalent silver oxide. As shown in FIG. 7 this reaction will leave a layer of the metal oxide 14 and a layer of monovalent silver oxide 15 between the divalent oxide pellet 11 and the metal plating 13 on the can 3. The inner surface of the cup 3 is plated prior to cell assembly. When the divalent oxide pellet 11 is placed in the cup 3 it oxidizes the surface of the plated layer 13 in the cup 3 it oxidizes the surface of the plated layer 13 to form thereon a film 14 of the oxide of that metal and simultaneously a layer 15 of monovalent silver oxide is reduced on the adjacent surface of the divalent oxide pellet 11. When this reaction is complete, the monovalent silver oxide layer 15 completely isolates the divalent oxide pellet 11 from all electronic contact with the metal oxide layer 14 and hence the cup 3. The presence of electrolyte absorbed throughout the pellet 11 will promote the reaction. By this method, it is possible to obtain the thinnest possible monovalent oxide layer and, hence, to include in the cell the greatest possible amount of divalent silver oxide. Several metals have been found to be suitable for plating the inner surface of the cup 3 to produce the isolating monovalent silver oxide layer. These include zinc, copper, nickel and silver.

The use of zinc for the plated layer 13 has several advantages in a silver-zinc cell system. First, it introduces no foreign ions into the cell. More important, however, the zinc oxide layer is readily formed in the presence of an alkaline electrolyte and provides an extremely low electrical resistance between the cup 3 and the pellet 11.

When nickel is used for the plated layer 13, its surface is oxidized by the divalent silver oxide to form a layer of nickel oxide which is converted by the electrolyte to nickel hydroxide. Both the nickel plating and the nickel hydroxide layer are good conductors. However, the reaction between the divalent silver oxide and the nickel is slow and requires cell aging before discharge to allow the monovalent silver oxide layer to form and completely isolate the divalent silver oxide pellet. In this respect, a two-weeks' stand at room temperature has been found satisfactory for the formation of the isolating monovalent silver oxide layer. The reaction between the nickel and the divalent silver oxide is accelerated by heat and the cell aging time can be reduced with higher aging temperatures. Care must be taken, however, not to expose the cells to temperatures which will cause the reduction of the divalent silver oxide in the cell to monovalent silver oxide.

Silver may also be used to produce the plated layer 13 provided the thickness of the layer is carefully controlled. Referring again to FIG. 7, the reaction between a silver-plated layer 13 and the divalent silver oxide pellet 11 will produce a monovalent silver oxide layer 14 on the plated silver layer 13 and a monovalent silver oxide layer 15 on the surface of the divalent silver oxide pellet 11. The monovalent silver oxide layer 15, because of its permeability to electrolyte, is a low resistance layer. The monovalent silver oxide layer 14, however, having been produced by the oxidation of a metallic surface lacks ionic permeability, and, as a result, forms a high resistance layer. Unless the thickness of the monovalent silver oxide layer 14 is limited, internal cell impedance rises to a point where the usefulness of the cell becomes very limited. By way of illustration, cells which normally would have internal impedances of 5 ohms have been found to develop internal impedances in the neighborhood of 300 ohms as the monovalent oxide layer 14 grows.

The resistance of the monovalent oxide layer 14 can be kept low by preventing it from developing to any substantial thickness. To accomplish this, the silver plated layer must be no more than a few molecular layers in thickness and of such character that it is substantially totally consumed by oxidation reaction producing a monovalent oxide layer 14 of limited thickness. When the thickness of the plated layer is properly limited, the monovalent silver oxide layer 14 will have the low resistance required for practical cell applications. This is shown schematically in FIG. 8 where the plated layer 13 is completely oxidized in the formation of the monovalent silver oxide layer 14 and disappears. The monovalent silver oxide layer 15 on the divalent silver oxide pellet 11 is developed as before.

In manufacturing electrodes of the type where the isolating monovalent silver oxide layer is produced by in situ reaction between a plated layer 13 and the divalent silver oxide pellet 11, care must be taken that the divalent silver oxide does not puncture or in any other manner disrupt the metal-plating layer and establish direct contact with the cup 3. This is particularly true with the case of a silver where the thickness of the plated layer must be extremely thin. As stated hereinbefore, if direct electronic contact is established with the divalent silver oxide, the conventional two-voltage-plateau discharge will be obtained rather than the monovalent oxide potential discharge which characterizes the present invention.

The cures of FIG. 9 demonstrate the increase in capacity actually available from a cell in accordance with the present invention. In this Figure Curve A is the discharge curve of a conventional silver-zinc cell, and Curve B is the discharge curve for a cell having a positive electrode in accordance with the present invention. The cell construction utilized in both cells was that shown in FIG. 4. The negative electrodes of both cells comprised lightly compacted battery grade metallic zinc amalgamated with 14 percent mercury. The cells were sealed with neoprene rubber grommets. In both cells the separation between the electrodes comprised a layer of Webril absorbent and a 3-mil layer of membrane made in accordance with the teachings of the aforementioned U.S. Pat. No. 2,965,697. The electrolyte absorbent layer was saturated with an electrolyte formulated by dissolving 100 grams of potassium hydroxide and 16 grams of zinc oxide in 100 cc. of water.

The positive electrode of Cell A comprised 1.73 grams of commercially available battery grade monovalent silver oxide compressed into a pellet 0.1 inches thick and 0.485 inches in diameter. The positive electrode of Cell B, the cell in accordance with the present invention, comprised a central pellet containing 1.2 grams of divalent silver oxide 0.085 inches thick and 0.387 inches in diameter. This central pellet was surrounded by 0.6 grams of monovalent silver oxide which was compressed to provide a composite pellet 0.1 thick and 0.485 inches in diameter. The divalent silver oxide mix from which the central pellet was compressed comprised 96 grams of a specially prepared low-gassing divalent silver oxide, and 4 grams of lead dioxide to which there was added 3.5 cc. of the electrolyte described hereinbefore for each 100 grams of the dry mix.

Both cells showed an open circuit voltage of 1.58 to 1.59 volts and each had an impedance lower than 6 ohms. The curves of FIG. 9 are for a continuous discharge of the cells through a 300-ohm resistance at a temperature of 73° F. As shown from these curves, Cell B, the cell in accordance with the present invention, exhibited approximately 30 percent more useful capacity than an identical size cell of the conventional monovalent silver oxide type. Of equal importance is the fact that this increase in capacity is achieved without the usual two-voltage-plateau discharge usually associated with divalent silver oxide.

Electrodes in accordance with the present invention have been constructed using electrode materials other than divalent and monovalent silver oxides. For example, divalent silver oxide has been discharged at the potential of 0.9 volts vs. zinc through a 300-ohm load at 73° F. by using cupric oxide as the second electrode material. The cupric oxide composite electrode was constructed by mechanically pressing finely divided cupric oxide around a pellet of divalent silver oxide. Another cupric oxide divalent silver oxide electrode was constructed in a manner similar to the electrode in FIG. 6. In this electrode the inner surface of the bottom cup of the cell was plated with copper which was subsequently oxidized to cupric oxide in the presence of potassium hydroxide electrolyte by the divalent silver oxide pellet.

Other electrode combinations are available. For example, manganese dioxide which has a potential in alkaline electrolyte vs. zinc of 1.5 volts may be discharged at the potential of cupric oxide. Such a manganese dioxide cupric oxide electrode has been constructed and discharged in accordance with the present invention by first pelletizing a small pellet of manganese dioxide and then compressing around the pellet an outer layer of finely divided cupric oxide. This electrode was discharged against zinc through a 300-ohm load at 73° F. at 0.9 volts.

Some examples of electrode combinations which may be constructed in accordance with the present invention together with open circuit voltages for such electrodes in alkaline electrolyte are listed in the following table:

TABLE II

| Primary Active Material | | Secondary Active Material | |
| --- | --- | --- | --- |
| Material | Voltage v. zinc (open circuit) | Material | Voltage v. zinc (open circuit) |
| $MnO_2$ | 1.5 | CuO | 1.1 |
| AgO | 1.8 | $Ag_2O$) | 1.6 |
| AgO | 1.8 | CuO | 1.1 |
| $KMnO_4$ | 1.8 | $Ag_2O$ | 1.6 |
| $KMnO_4$ | 1.8 | CuO | 1.1 |
| AgO | 1.8 | $PbO_2$ | 1.5 |

In each case the primary active material must be able to oxidize the discharge product of the secondary active material. If the materials chosen meet this requirement and the primary active material is in electronic contact with the secondary active material while the discharge circuit has electronic connection only with the secondary active material as described, the electrode will discharge only at the lower potential of the secondary active material.

From the foregoing, it can be seen that by means of the novel method and the unique electrode structure described, there has been provided electrode means for achieving a single potential discharge from an electrode-active material such as divalent silver oxide which discharges at two potentials. In addition, it is possible to utilize the capacity of an electrode-active material at the lower potential of a second active material Of equal importance is that the method and the electrode construction of the present invention provides the means for controlling within certain limits the discharge potentials of active materials. This not only provides flexibility in cell design, but in many instances, also a means for achieving higher capacity cells than heretofore have been available. In considering the present invention, it also should be noted that, while zinc electrodes have been used as reference electrodes and for the negative electrode of the specific cells described, this has been done for the purpose of illustration only and not by way of limitation. An electrode in accordance with the present invention may be utilized in cells where the electrode of the opposite polarity is of any conventional type.

Having described this invention, that which is claimed as new is:

1. In a battery having a positive electrode, a negative electrode, and an electrolyte, the improvement comprising a positive electrode having a principal active material which is manganese dioxide, a secondary active material which is cupric oxide and an electrical contact means, said two active materials being geometrically arranged in such a manner that said secondary active material is interposed between said principal active material and said electrical contact means as a continuous layer in physical and electrical contact with said principal active material physically isolating principal active material from said contact means, said secondary active material having a lower potential than said principal active material and a discharge product which in the presence of the electrolyte is oxidized by said principal active material to form a secondary active material adjacent to the interface with said principal active material, said oxidation reaction proceeding at a higher rate than the reaction between the principal active material and the negative electrode, said electrode being sufficiently porous to permit electrolyte to be present at the site of said reaction between said principal active material and the discharge product of said secondary active material, said battery having an output voltage throughout discharge of said two active materials characteristic of the couple formed by said secondary active material and said negative electrode.

2. In a battery having a positive electrode, a negative electrode, and an electrolyte, the improvement comprising a positive electrode having a principal active material which is potassium permanganate, a secondary active material which is an oxide selected from the group consisting of cupric oxide and monovalent silver oxide, and an electrical contact means, said two active materials being geometrically arranged in such a manner that said secondary active material is interposed between said principal active material and said electrical contact means as a continuous layer in physical and electrical contact with said principal active material physically isolating principal active material from said contact means, said secondary active material having a lower potential than said principal active material and a discharge product which in the presence of the electrolyte is oxidized by said principal active material to form a secondary active material adjacent to the interface with said principal active material, said oxidation reaction proceeding at a higher rate than the reaction between the principal active material and the negative electrode, said electrode being sufficiently porous to permit electrolyte to be present at the site of said reaction between said principal active material and the discharge product of said secondary active material, said battery having an output voltage throughout discharge of said two active materials characteristic of the couple formed by said secondary active material and said negative electrode.

3. In a battery having a positive electrode, a negative electrode, and an electrolyte, the improvement comprising a positive electrode housed in a cathode cup the principal active material of which consists of divalent silver oxide and the remaining active material of which consists of a continuous layer of monovalent silver oxide in physical and electrical contact with said divalent silver oxide, said layer of monovalent silver oxide physically isolating said divalent silver oxide from contact with said cathode cup, said layer of monovalent silver oxide being disposed against the inner surface of said cathode cup which inner surface is wet by said electrolyte and consists of a metal capable of being oxidized by said divalent silver oxide in the presence of said electrolyte, said layer of monovalent silver oxide being formed on said divalent silver oxide as a result of said divalent silver oxide being disposed against the inner surface of said cathode cup, which inner surface consists of a layer of a metal selected from the group consisting of zinc and copper, and said battery being characterized throughout discharge by a potential characteristic of monovalent silver oxide.

4. In a battery having a positive electrode, a negative electrode and an electrolyte, the improvement comprising a positive electrode having an electrical contact means housing a principal active material which consists essentially of a first metallic oxide and a secondary active material which consists essentially of a continuous layer of a second metallic oxide in physical and electrical contact with said first metallic oxide, said layer of second metallic oxide physically isolating said first metallic oxide from said contact means which comprises the sole electronic contact with said active materials, said layer of second metallic oxide being disposed against the inner surface of said contact means which inner surface is wet by said electrolyte and consists of a metal different from the metal of said first metallic oxide, the metal of said inner surface being capable of being oxidized by said first metallic oxide in the presence of said electrolyte, said layer of said second metallic oxide being formed on said first metallic oxide as a result of said first metallic oxide being disposed against the inner surface of said contact means, and said battery being characterized throughout discharge by a potential characteristic of said second metallic oxide and said negative electrode in said electrolyte.

5. A battery in accordance with claim 4 in which the first metallic oxide is divalent silver oxide and the second metallic oxide is monovalent silver oxide.

* * * * *